(12) United States Patent
Diefenbacher et al.

(10) Patent No.: US 8,467,070 B2
(45) Date of Patent: Jun. 18, 2013

(54) METHOD AND SCANNING ARRANGEMENT FOR THE CONTACTLESS SCANNING OF THREE-DIMENSIONAL OBJECTS AND DEVICE FOR HOLDING THE OBJECTS

(75) Inventors: Rolf Diefenbacher, Eglisau (CH); Dean Stoops, Corona, CA (US)

(73) Assignee: DST Swiss AG, Eglisau (CH)

( * ) Notice: Subject to any disclaimer, the term of this patent is extended or adjusted under 35 U.S.C. 154(b) by 1376 days.

(21) Appl. No.: 10/598,639

(22) PCT Filed: Mar. 9, 2005

(86) PCT No.: PCT/EP2005/051057
§ 371 (c)(1),
(2), (4) Date: Sep. 2, 2009

(87) PCT Pub. No.: WO2005/088242
PCT Pub. Date: Sep. 22, 2005

(65) Prior Publication Data
US 2010/0149550 A1    Jun. 17, 2010

(30) Foreign Application Priority Data
Mar. 10, 2004    (EP) .................................. 04005732

(51) Int. Cl.
*G01B 11/24*    (2006.01)
(52) U.S. Cl.
USPC ........................................................ 356/601

(58) Field of Classification Search
None
See application file for complete search history.

(56) References Cited

U.S. PATENT DOCUMENTS 5,028,799 A * 7/1991 Chen et al. ............... 250/559.23
5,850,289 A * 12/1998 Fowler et al. ................. 356/603

FOREIGN PATENT DOCUMENTS

| DE | 3315576 | 10/1984 |
| DE | 3910855 | 10/1990 |
| DE | 4208455 | 9/1993 |
| DE | 19710273 | 8/1998 |
| DE | 19927872 | 10/2000 |
| DE | 10105774 | 8/2001 |
| EP | 0671679 | 9/1995 |
| EP | 1225421 | 7/2002 |

\* cited by examiner

*Primary Examiner* — Gregory J Toatley
*Assistant Examiner* — Amanda Merlino
(74) *Attorney, Agent, or Firm* — Shoemaker and Mattare

(57) ABSTRACT

The invention concerns a method for the contactless scanning of three-dimensional objects (1). The objects are scanned using a bundled light beam (7), preferably using a laser beam. The object is scanned in at least two different measuring sections. When scanning in two different measuring sections, the measuring lines on the object (1) are not parallel. As an alternative or additional option, the object (1) is rotated during one measuring operation and not during the other.

35 Claims, 14 Drawing Sheets

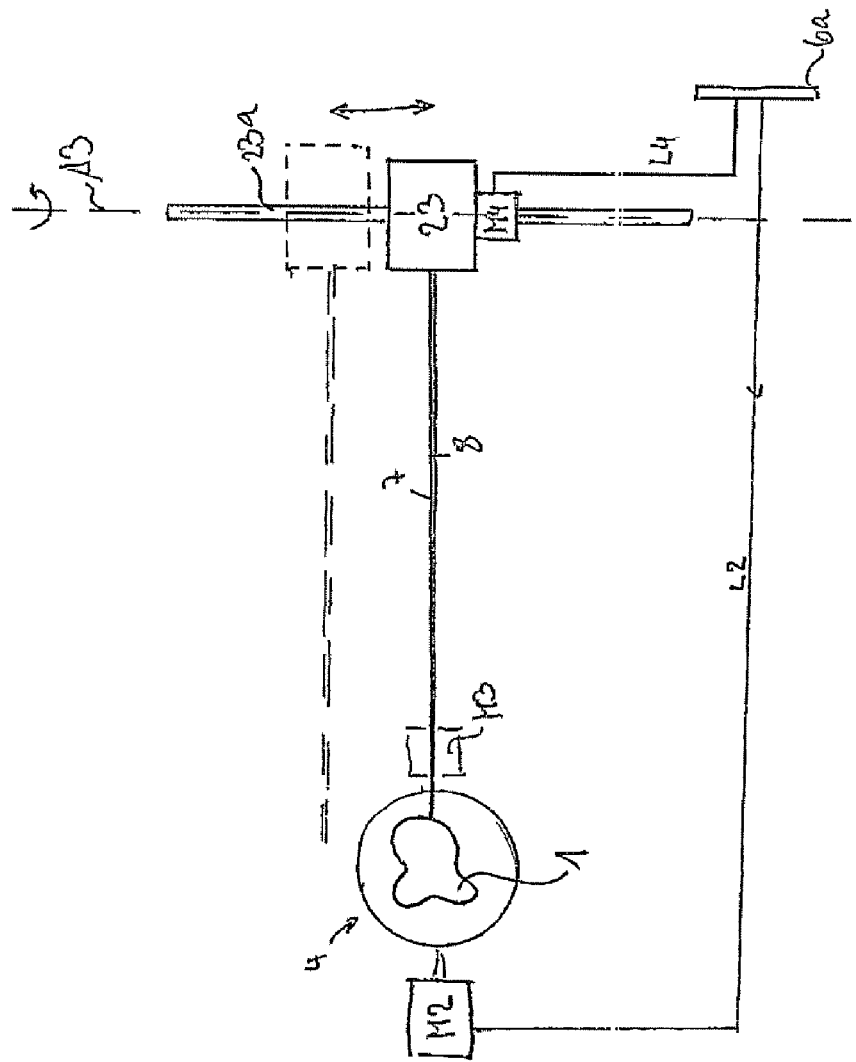

Figure 1A:
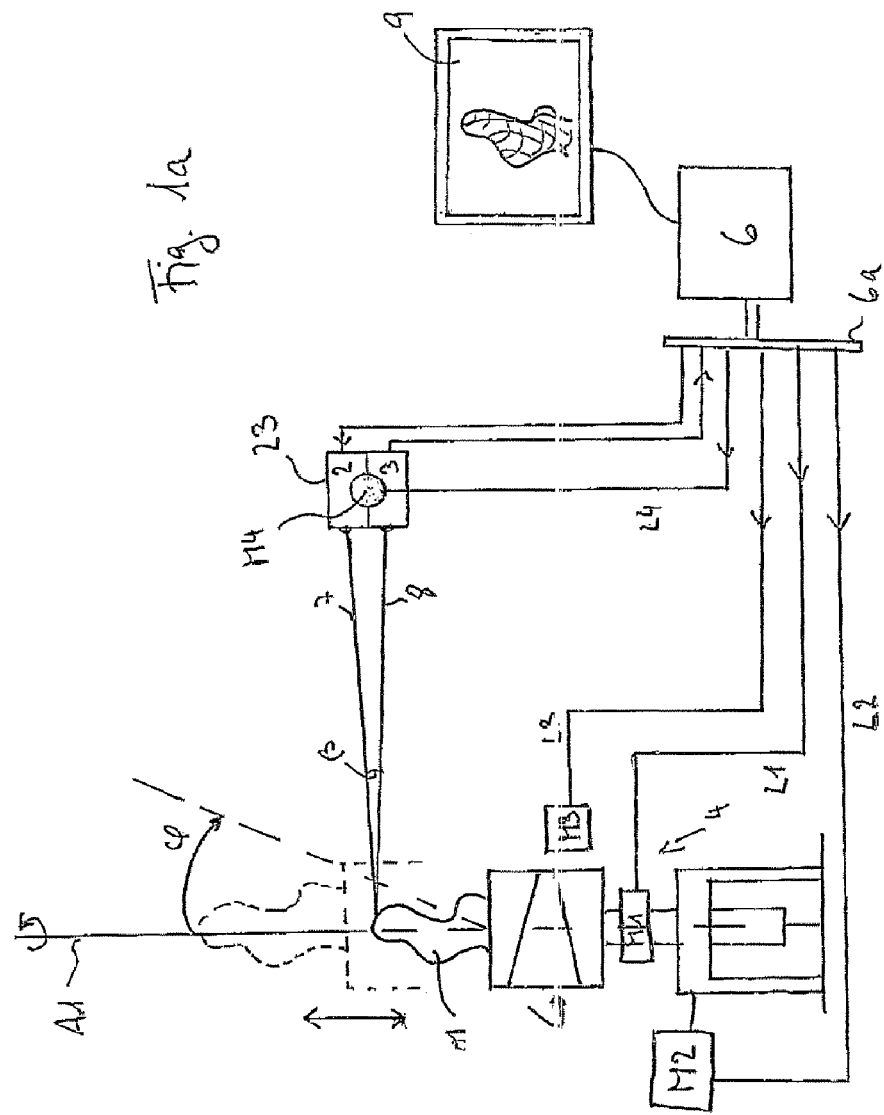

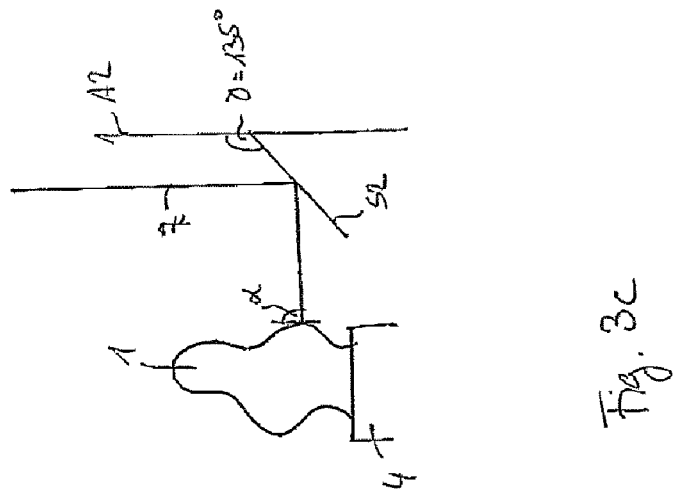
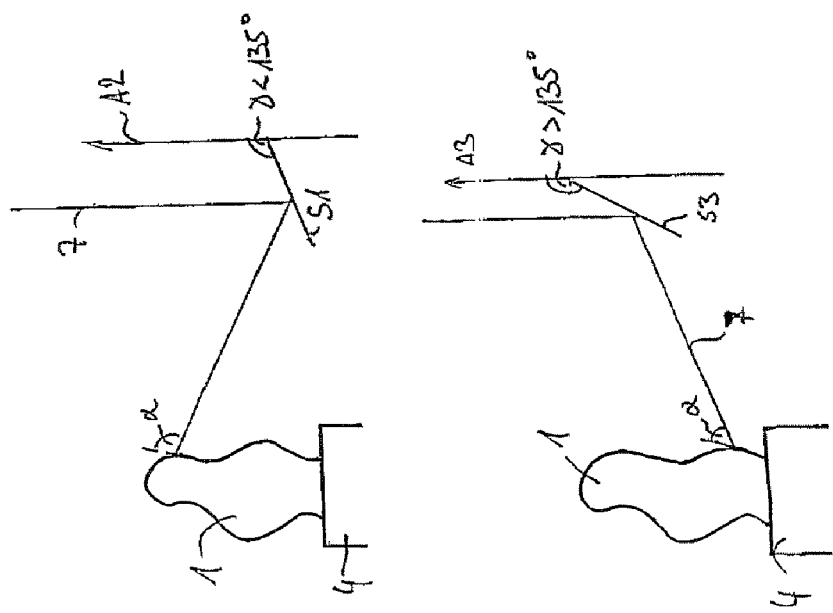
Fig. 3c

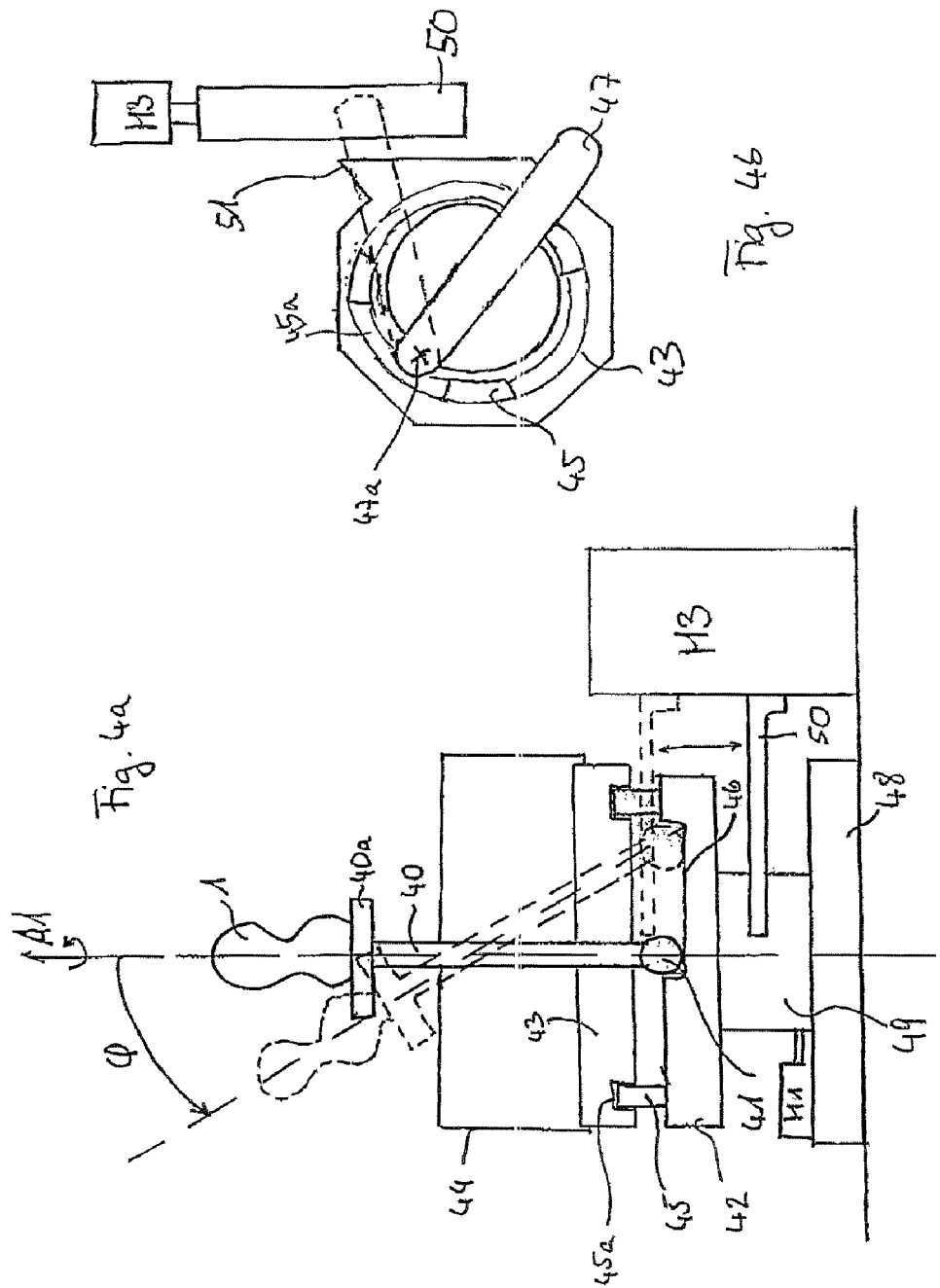

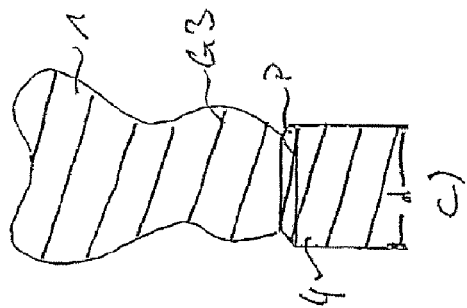
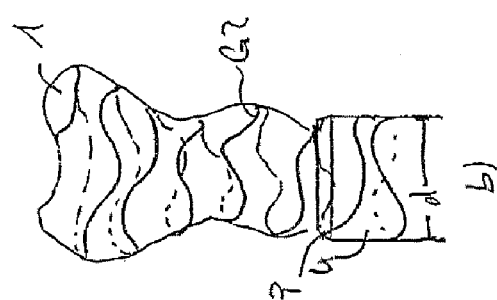
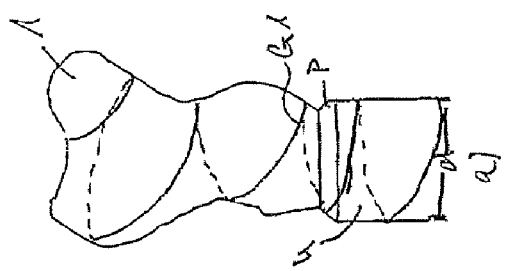
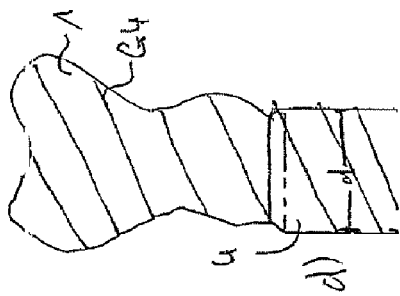
Fig. 8

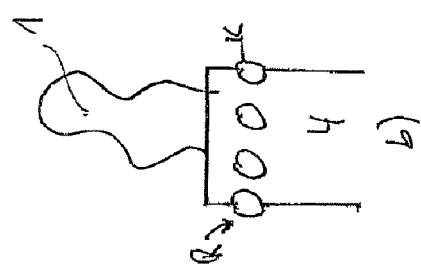
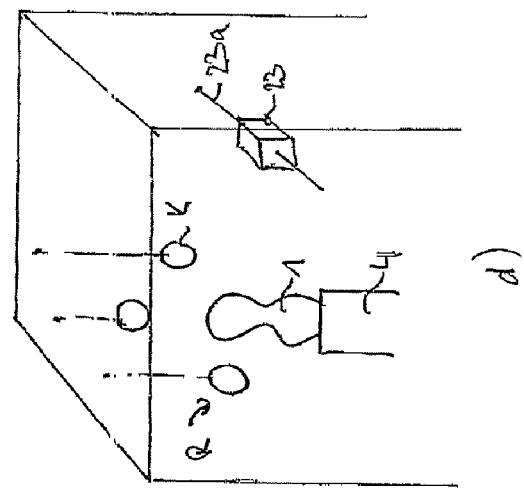
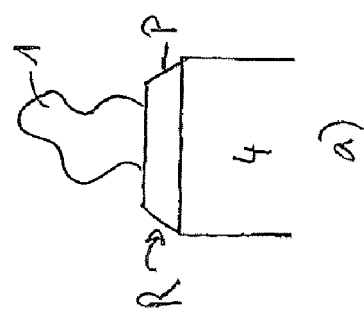
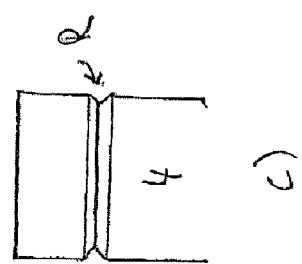
Fig. 9

METHOD AND SCANNING ARRANGEMENT FOR THE CONTACTLESS SCANNING OF THREE-DIMENSIONAL OBJECTS AND DEVICE FOR HOLDING THE OBJECTS

The invention relates to a method and to a scanning arrangement for the contactless scanning of three-dimensional objects by means of laser light, and to a device for holding objects according to the independent patent claims.

In order to be able to represent three-dimensional objects in digital form, methods are used which are based on scanning the objects by means of a light beam. An example is found in EP 671 679. A method is represented in which the object to be surveyed is rotated about the vertical axis on a turntable and at the same time is scanned on an annular circumferential line. After each rotation of the object, the scanning head is moved in its height, after which the object is scanned on a next ring. To measure the position of a measurement point, an optical triangulation is performed with the aid of two receiver cameras.

One problem in the scanning arises in the case of objects with complicated shape which exhibit undercuts. With a fixed adjustment of the light beam, these undercuts can usually not be covered, or only very inadequately so. In EP 671 679, therefore, the scanning head can be pivoted in the horizontal plane, on the one hand, so that the angle at which the light impinges on the object can be varied in the horizontal plane. On the other hand, the scanning head can also be tilted in the vertical alignment so that the angle at which the light impinges on the object can also be varied in the vertical direction.

In spite of these approaches to a solution, undercuts cannot be covered in some cases. A further problem is the accuracy of the measurement. To obtain reliable digitization, the measurement points on the object ought to be less than 0.4 mm, preferably less than 0.2 mm apart from one another. Due to the annular scanning by means of light beam and sequential measuring of discrete light values, a grid pattern of measurement values is produced which extend from the lines defined by the light beam on the object. In the case of irregular surfaces, in particular, it is difficult to achieve the required density of measurement points. For example, in order to halve the line spacing, the height advance of the scanning head would also have to be halved. This leads to complex mechanical adjustment systems, a greater influence of mechanical tolerances of the advance and extended scanning time.

It is the object of the present invention to overcome the disadvantages of the prior art, to create, in particular, methods and scanning arrangements for the contactless scanning of three-dimensional objects by means of which the measuring accuracy can be increased and undercuts in complicated objects can be covered more reliably. Further objects of the invention are especially to accelerate, to simplify the scanning methods and also to provide for a simple and cost-effective design of the scanning arrangement.

These objects are achieved by means of methods and scanning arrangements and holding devices according to the invention.

In the method for the contactless scanning of three-dimensional objects, the objects are scanned by means of a collimated light beam, preferably a laser beam. The frequency of the light beam can be both in the visible band and in the band not perceptible to the eye.

In the present method, the object is scanned in at least two different measuring sections. A measuring section designates the scanning process of a predetermined area of the object. This area is scanned on measurement points which can lie on one or more lines in the area. A measuring section is a scanning process in which the manner in which the light beam impinges on the object is not changed during the scanning. If the object is intended to rotate, e.g. in a measuring section, it rotates during the entire measuring section and the angle of light incidence on the object is not changed.

It is possible that the same area is scanned in a number of measuring sections in that, after a measuring section, the adjustments for light beam and object are changed for the next measuring section. For example, the same area can be scanned by rotating the object in one case and moving the light beam over the object in another case.

Measurement points are the points on the surface of the object onto which the scanning light beam impinges and the reflected light is measured by a light sensor or a scanning device. By means of the measurement, the position of the measurement point is determined and calculated for the digital representation of the object and stored. The distance of a measurement point from the scanning arrangement can be calculated trigonometrically, e.g. by evaluating a number of measurement points. In commercially available receivers, particularly CCD arrays, the distance of a measurement point is determined and output directly.

The size of a measurement point depends on, among other things, the exposure time of the point, that is to say the period during which the reflected light beam is received. If scanning is performed with a continuous light beam, the measurement points are generated, e.g. by means of a trigger at constant intervals in time or represented by sequential discrete measurement values of a sensor.

In conjunction with the present invention, at least two different measuring sections are provided which lead to different groups or "clouds" of measurement points which represent the object and enable it to be displayed. The object or parts of the object are thus represented separately at least twice. The measurement results of the two or more measuring sections are subsequently combined.

In the case of two different measuring sections, the lines of the measurement points which are produced on the surface of the object cannot be parallel. As an alternative or additionally, the object can rotate in one measuring section and not in the other. The advantage of this method is, especially, that the object representations generated by different measuring sections alternately complement one another. When the measurement points of the two measuring sections extend on lines which are not parallel, the second measuring section produces intermediate measurement points on lines which extend at an angle to the lines of the first measuring section. This means mathematically that on the first "grid" of measurement points, a second grid is superimposed which is at an angle to the first one.

A mapping of the stationary object, that is to say the non-rotating object, results in other measurement points than the scanning of a rotating object in which the scanning is generated, as a rule, along a line extending helically over the object. The reason for this is that the light beam impinges on the object at different angles to the surface depending on whether it is rotating or not. As a result, intermediate points are reached and the measuring lines are thus supplemented.

The method can also be applied only for part-areas of the object. This is of advantage, e.g. if it is known what parts of the object are difficult to cover, e.g. due to undercuts or other surface irregularities. In such a case, for example, the object can be covered in its entirety in the first measuring section and only to a limited extent on an object section in the second measuring section. As already stated, one of the essential advantages of this method is that due to different measuring sections, different measurement points on the surface of the object are represented. This increases the resolution of the representation of the object and shortens the measuring period. In this arrangement, the order of measuring sections can be selected. The essential factor in the present method is that at least two different measuring sections are performed, the measurement values of which, representing the object or parts of the object, are combined.

The measurement values of the different measuring sections are then combined to form a digital representation of the object, by which is meant that the measurement values of the measuring sections are entered in a common virtual grid. If many measurement values approximately describe the same point, the density of the measurement values in the grid can be reduced, e.g. by averaging the positions of a number of adjacent points. Another variant is given by filtering the measurement points as will be described below.

It has hitherto been found to be advantageous if a predetermined number of measuring sections is performed before the data obtained are evaluated. Further scanning of the object after this number of measuring sections should only be necessary in exceptional cases. The number and type of measuring sections can be optimized by empirical values if similar objects are always scanned (e.g. always ear or tooth impressions).

However, it is quite easily possible to evaluate the measurement data after a base of at least two measuring sections and to continue to scan the object selectively in areas with lacking or inadequate measurement points by means of adapted measuring sections. This procedure can prove to be very efficient, given good computer power.

In a preferred embodiment, the light beam is directed to the object via a mirror arrangement. Depending on the type of construction of the arrangement, it is possible to direct the beam over the object on different paths and/or at different angles, e.g. by means of different mirrors or one or more tiltable mirrors. Two different measuring sections can be achieved, e.g. in that the light beam is directed over the object via the mirror arrangement in such a manner that the measurement lines are not parallel. The same effect can also be achieved if the light transmitter and/or the light sensor (e.g. a camera) are arranged adjustable relative to the object.

It is advantageous if the object is tilted for a new measuring section compared with the position of an earlier measuring section. The object is considered to be tilted if it is rotated by a predetermined angle of preferably less than 90°, preferably about 10° to 45°, about an axis which is not approximately perpendicular to the measuring lines of the first measuring section. Due to the tilting, non-parallel measuring lines are produced on the object in a subsequent measuring section even if the guidance of the light beam is not changed.

It is possible that the object rotates about an axis of rotation in at least one measuring section. During this process, the incident light beam and the object are moved relative to one another in such a manner that the measurement points are along one line on the surface of the object. It is of no importance whether the light beam passes directly from the light source to the object or whether it is directed to it via a mirror arrangement. In particular, a simple construction of the deflection arrangement, associated with great measuring accuracy, can be achieved if the light beam is directed to the object via at least one mirror. This also prevents mechanical stressing of the light source.

If the light beam and the rotating object are moved with respect to one another in the direction of the axis of rotation, a helical line of measurement points is produced on the surface of the object.

Another possibility for performing a measuring section is to move the light beam in approximately parallel lines over the non-rotating object. This is advantageously achieved by directing the light beam on the object via a moving, particularly rotating mirror arrangement. As an alternative, this can also be achieved by arranging the light transmitter to be movable.

If a movable light transmitter is used, it is more advantageous to direct the light over the resting object in zigzag lines. In this case, data can be received both on the forward and on the return path of the light transmitter. For the entire side facing the transmitter to be scanned, the reversing points of the zigzag line are preferably located outside the object. Given a good prior knowledge of the object size, however, it is also possible to map the reversing points on the object and to include them in the measuring section. To direct the light beam over the object in zigzag lines via a mirror arrangement, an oscillating mirror can be used, for example.

The measuring accuracy can be increased further if the light beam is directed to the object at different angles to the surface. This can be done in the case of similar measuring sections and also in the case of different measuring sections. For example, it is advantageous to direct the light onto the object via a pivotable mirror or via a number of mirrors located at an angle to one another. It is also possible to mount the light transmitter to be pivotable so that the light beam is directed to the object at different angles.

To provide referencing in conventional scanning methods, a calibration object is attached to the object holder from time to time; the measurement values of this object determined during the scanning are used for calibrating the device. In the case of the invention, the device does not need to be calibrated. Instead, at least one reference object outside the object is also scanned in addition to the object in predetermined measuring sections. A reference object is characterized in that it is unambiguous and that its position with respect to the object is known or can be calculated. For example, referencing can be done always in the first measuring section of a new object. Scanning the reference objects can be performed before or after the scanning of the object. If it is known when the referencing takes place, it is also possible for the reference objects to be scanned during a measuring section.

It is advantageous if at least one reference object is also scanned in each measuring section. Each measurement value is then related to one or more reference values which increases the accuracy of the determination of the object points represented by the measurement values.

The number of reference objects must be selected in such a manner that, given a known geometry of the measuring arrangement and with a known measuring procedure, it is possible to allocate to each measurement point a position in three-dimensional space. To provide reliable referencing, it is advantageous if reference objects are located within the field of view of the light beam in each position and in each measuring section, respectively.

It is advantageous if a part of a device for holding the object is used for referencing because this is always located in the same position relative to the object. For this purpose, parts of the holding device can be unambiguously marked, e.g. by means of protruding or receding shapes such as spherical sections, rings or conical sections. It is also possible for a bezel, that is to say a taper on the holding device to serve as a reference object.

This type of referencing has been found to be extremely accurate. It can be advantageously used in methods in which objects or object points are determined or measured in a space. The main advantages of this method are, apart from the accuracy of measurement, also the simplicity in handling and the speed with which the object can be scanned. If a reference object is scanned at least once in the course of a measuring section, all other measurement values can be placed in a reliable relationship to the reference values. Errors in the movement of the scanning mechanism, e.g. when the holding device is not running concentrically during the rotation, can also be detected and taken into consideration in the calculation.

To be able to process measurement values in accordance with their accuracy, an auxiliary signal can be generated which contains information on the surface characteristics of the object at the location of the impinging light beam and/or about the characteristics of the light beam impinging on the object. This can relate, for example, to the color and/or reflectivity of the object or the shape and/or size of the illuminated place on the object. The auxiliary signal can contain a number of these or similar information items. Such auxiliary signals can be determined, e.g. in a simple manner by means of a CCD camera, preferably a color-sensitive CCD camera. Preferably, the associated information from the auxiliary signal is allocated to each measurement value.

The auxiliary signal can be generated by means of a preferably color-sensitive light receiver, particularly a camera. At the time of the application, CCD cameras are particularly preferred because they can generate and forward much information.

Measurement values can be processed with the aid of the information of the auxiliary signal. For example, measurement values in which the size and/or shape of the light spot on the surface of the object does not meet a predetermined standard are discarded. If, e.g. a light beam only grazes the object laterally or impinges at an oblique angle of incidence, the measurement values are inaccurate or cannot be used. This can be concluded, e.g. from the shape of the reflected image or the intensity of the reflected light. Since weak reflected signals can also be caused, e.g. by a color change on the surface of the object, it is advantageous if, at the same time, color values are taken into consideration as auxiliary signal. As an alternative or additionally, measurement values can also be discarded on the basis of the intensity of the measurement signal. It is the aim to filter out the measurement values which are unsafe because of too weak a signal or too flat a reflection angle, and not to take them into consideration in the final representation of the object.

It is advantageous to change the exposure time on the basis of the surface information. A dark or poorly reflecting place on the object could be exposed for a longer time than a bright one. In order to maintain measuring accuracy, the speed at which the light beam is moved over the object should be adapted to the exposure time. In the case of a longer exposure time, the object must be moved correspondingly more slowly.

It is also possible to change the light intensity of the incident light beam on the basis of the surface information. For example, the light intensity could be increased if the light beam impinges on a dark or poorly reflective place on the object.

Using this method, fluctuations in the signal strength of the received measurement signal due to different reflection values on the surface can be compensated for, for example. Different reflection values are produced, for example, in the case of different colors or with matt or shiny places on the object. Errors can be reduced by correcting the measurement values in dependence on the surface characteristics.

The method is particularly advantageous if the object is scanned at least once while rotating and at least once while not rotating and, in addition, is tilted in a measuring section compared with the position of an earlier measuring section. It is also advantageous if the light beam is directed to the object via a rotatable mirror arrangement and during each measuring section, a part of the holding device is also scanned for referencing. This increases the measurement accuracy and the probability that undercuts can be covered.

The scanning arrangement for the contactless scanning of three-dimensional objects comprises a transmitter for sending out collimated light beams, particularly laser beams, and a receiver for detecting light signals. It also has a holding device for receiving the object and is connected or can be connected to a control and computing arrangement. This control and computing arrangement can be a normal PC but can also be a computer unit built into the arrangement.

A deflection arrangement for deflecting the light beam over the surface of the object is provided. Using this deflection arrangement, it is possible to scan the object in at least two different measuring sections. The deflection arrangement comprises an optical arrangement for directing a light beam on the object in familiar manner. For example, the deflection arrangement can comprise a moving mechanism for the light transmitter or the holding device and/or have a mirror arrangement for directing the light beam or for changing the angle relative to the object.

The holding device for the object is preferably rotatable about an axis of rotation. By this means, the object can be scanned while rotating.

In the deflection arrangement, an arrangement for tilting the object for a measuring section compared with the position of the object in an earlier measuring section can be provided. This achieves in a simple manner that the object can be scanned by two different measuring sections. This arrangement can be built into the device for holding the object so that it or parts thereof can also be tilted together with the object.

The deflection arrangement for deflecting the light beam is advantageously designed in such a manner that the holding device and the incident light beam can be moved with respect to one another in such a manner that the entire object can be scanned. This is possible by moving the holding device and/or by moving the incident light beam. The incident light beam can be advantageously moved by the transmitter being arranged movably and/or by it being directed to the object via a moving mirror arrangement. It is not necessary for the entire object to be scanned in each measuring section, in a measuring section, a certain area of the object can also only be scanned.

Particularly fast scanning is possible if the deflection arrangement is provided for directing the light beam in approximately parallel lines over the non-rotating object. This is advantageously achieved by directing the light beam to the object via a moving mirror; as an alternative, the light transmitter can also be arranged to be movable. It is also conceivable for the object to be moved.

Minimization of the mirror arrangement can be achieved, e.g. if the light beam is moved over the object in zigzag-shaped lines where the reversing points of the zigzag line do not need to lie on the object. This is also advantageous if the light transmitter is moved to and fro on a rail because measuring is then possible on the forward and on the return path of the transmitter. If the light beam is directed to the object via an oscillating mirror, zigzag lines are also produced on the object. If, however, the light beam is conducted to the object via a rotating mirror, approximately parallel lines are more advantageous which ensures fast scanning.

In addition, a deflection arrangement is advantageous which allows the light beam to be directed to the object at different angles to the surface of the object. The measuring accuracy can also be increased by this means. Especially, undercuts of the object can be imaged more reliably. The measuring lines of the measuring sections at different angles can extend in approximately parallel and in non-parallel lines. The lines can also have a curved variation. This is the case, especially if objects are tilted and rotate, i.e. "tumble" relative to the light beam. Measuring sections at different angles are also advantageous if the object is scanned several times in succession while it is rotating. In this case, the lines of the individual measuring sections are approximately parallel.

The deflection arrangement can comprise a mirror arrangement for deflecting the light beam to the object. A particular form of a mirror arrangement comprises a number of mirrors which are arranged to be rotatable about a common axis. During the rotation, the various mirrors pass sequentially into the beam path of the light source, e.g. at different angle. Such a mirror arrangement is advantageous in a scanning arrangement as described above, can be advantageously used for scanning in parallel or non-parallel and with rotating and stationary objects or generally used for scanning processes with light beams.

The mirrors are advantageously firmly attached to the mirror arrangement, at least some of them at different angles to the axis of rotation. Depending on the choice of mirror, the light beam is directed to the object at a different angle to the surface of the object. Mirror inclinations of 120° to 150° with respect to the axis of rotation are particularly suitable, the arrangement as a whole has the form of a polygonal truncated pyramid. The desired mirror can be brought into its active position in each case by rotation. In this process, the mirror or the axis of rotation can be pivoted even in an oscillating manner so that the individual mirror scans in the form of a line and in zigzag form.

When the entire mirror arrangement is rotated, the light beam is directed over the object in lines successively at different or identical angles to the surface of the object. If the mirror arrangement and the device for holding the object are moved at the same time, relative to one another, parallel measuring lines are produced on the surface of the object. The great advantage of this mirror arrangement is that with one measuring pass, i.e. displacing mirror arrangement and holding device once with respect to one another, a number of measuring sections can be made in which the light beam is directed to the object at different angles. As a result, the entire measuring period can be distinctly reduced.

A measuring pass with such an arrangement can take place especially quickly if the mirrors of the mirror arrangement are subdivided into at least two identical groups, wherein all mirrors within each group are attached at different angles to the axis of rotation and the groups are arranged following one another around the axis of rotation. The consequence of this is that during one rotation of the mirror arrangement, the same mirror inclination passes n-times into the path of the light beam and, as a result, the object is scanned n-times at the same angle, namely always after 360°/n of the rotation of the mirror arrangement, where n is the number of groups. As a result, the scanning speed can be increased by a factor of n per revolution of the mirror holder. The number n of identical groups should be optimized with respect to the size of the arrangement and the number of different mirror inclinations. A number n of 2 to 3 has hitherto been found to be advantageous.

In a further embodiment, the scanning arrangement comprises an arrangement for generating an auxiliary signal which contains information about surface characteristics of the object and/or about the characteristics of the scanning light beam on the object in the vicinity of the point where the light beam impinges on the object. This arrangement comprises a preferably color-sensitive light receiver, particularly a camera. A CCD camera is particularly preferred since it can generate and forward much information.

The information evaluated as auxiliary signal can relate to the color and/or reflectivity, particularly the degree of dullness of the surface, particularly in the vicinity of the impinging light beam. Additionally or as an alternative, the information can contain information about the size and shape of the light beam illuminating the surface when it impinges on the surface. This can be achieved, for example, by means of one or more diaphragms.

It is possible that the measurement signal and the auxiliary signal can be detected in the same receiver. This makes it possible to reduce the costs of the arrangement.

The generation and application of such an auxiliary signal can be used particularly advantageously in the scanning arrangement according to the invention, but can also be used in other methods or scanner arrangements for scanning objects.

It is possible that, for the purpose of referencing, a reference object is placed and scanned on the object holder. The scanning arrangement can be calibrated to the known dimensions of the reference object. However, it is advantageous if the scanning arrangement itself has at least one reference object. As described above, a reference object is unambiguous and its position with respect to the object is known or can be calculated. At least one reference object must be scannable in predetermined measuring sections.

Particularly advantageously, at least one reference object is located on the holding device. This moves together with the object which simplifies the analysis of the position of a measurement point. In addition, errors in the movement can be taken into consideration, e.g. if the holding device is not running concentrically during the rotation.

As reference objects, parts of the holding device can be unambiguously marked, e.g. by means of protruding or receding shapes such as spherical sections, rings or conical sections. A conical area on the holding device, e.g. a bezel on an edge of the holding device can also be used as reference object. However, it is also possible that at least one, preferably a number of at least partially spherical bodies on the holding device or in the scanning arrangement represent reference objects. The center of the sphere, which can be calculated very accurately by simultaneously scanning the surface of the sphere can be selected for referencing.

This type of referencing is advantageous not only in an arrangement according to the present invention but can be used for all possible constructional types of scanning devices. The accuracy of the measurement is increased if the referencing is done not via a calibration but via reference objects contained in the scanning arrangement, wherein the real measurement values of an object during the measuring section can be related to the measurement values of the reference objects.

It is advantageous if the device for holding the object can be rotated about an axis of rotation and has an arrangement for holding the object. This holding arrangement preferably consists of a holding bench and an axle, but other arrangements are also conceivable.

The holding device also comprises a tilting device for tilting the holding arrangement by a predeterminable angle with respect to the axis of rotation. This tilting device has a switch-over arrangement by means of which the holding arrangement is displaced between different positions. The switch-over arrangement comprises an actuating element which is actuated by rotating the holding device. This actuating element is preferably a lever which protrudes over the holding arrangement and can be engaged with movable stop in order to trigger the tilting movement by simple rotation of the holding device.

Particularly advantageously, the holding device can be tilted in various directions relative to the scanning arrangement. As a result, it is possible to scan undercuts at different angles of view which increases the probability of covering the entire surface of the object.

The holding arrangement can have a straight axle which is supported pivotably in all directions in a receiving arrangement. This receiving arrangement advantageously consists of a sphere and a counterbearing in which the sphere is supported. The sphere can be held in the counterbearing, e.g. by means of a spring. This form of receiving arrangement has the advantage that the object, when tilted, is not lowered at the same time.

This type of holding device can be used particularly advantageously in a scanning arrangement according to the present invention.

The method and the scanning arrangement according to the present invention can be used in a multiplicity of fields of application. For example, impressions of teeth or auditory passages can be represented digitally which simplifies and speeds up the production of artificial teeth or hearing aids. However, the method and the arrangement are also suitable for obtaining digital representations of components from mechanical technology, particularly of precision parts and parts which are produced in small numbers. The list of fields of application could be extended arbitrarily. Thus, the method and the arrangement are used wherever digital images of three-dimensional objects are to be generated.

Figure 2:
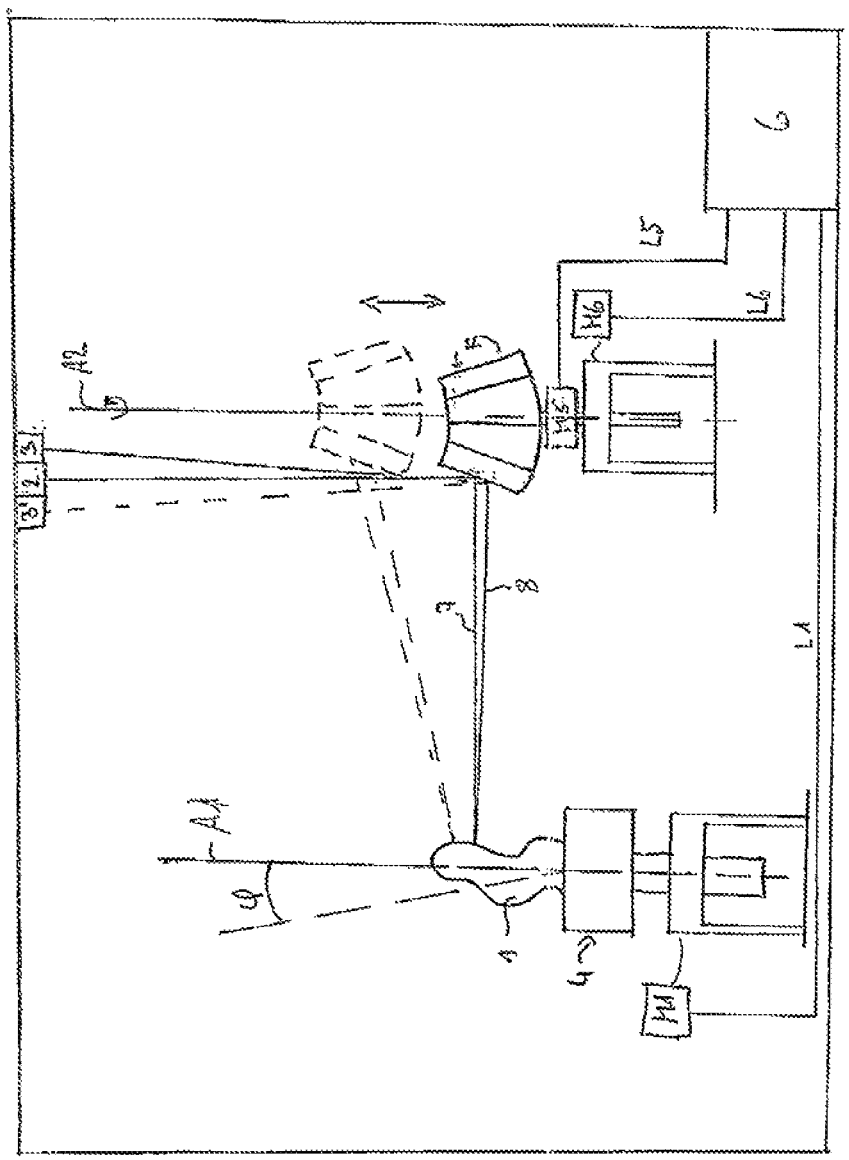
Figure 3B:
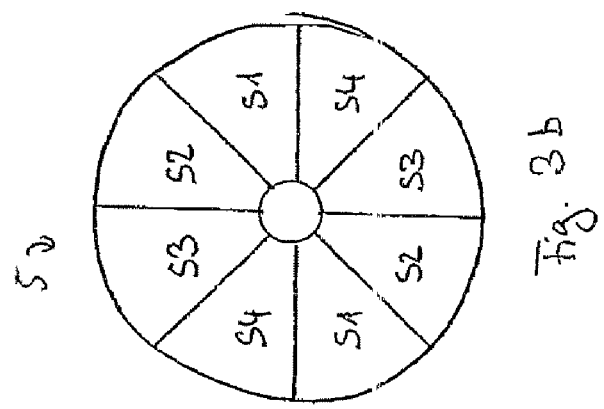
Figure 3A:
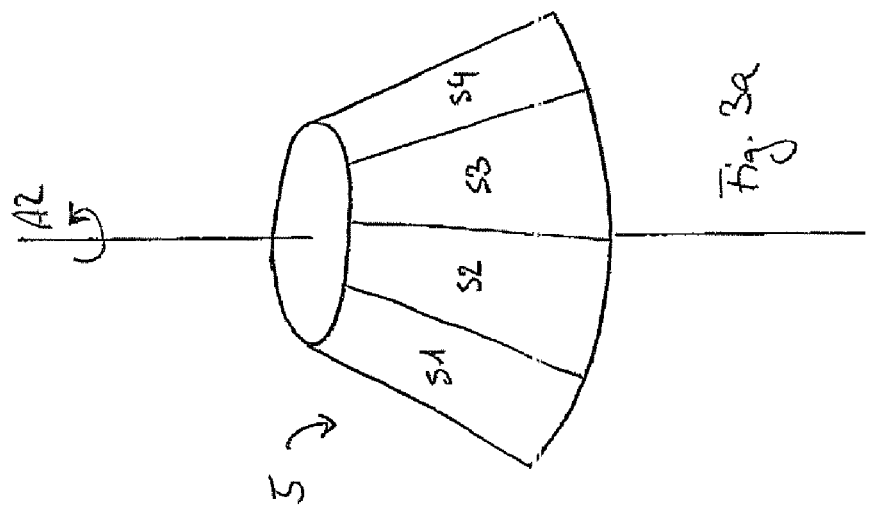
Figure 5:
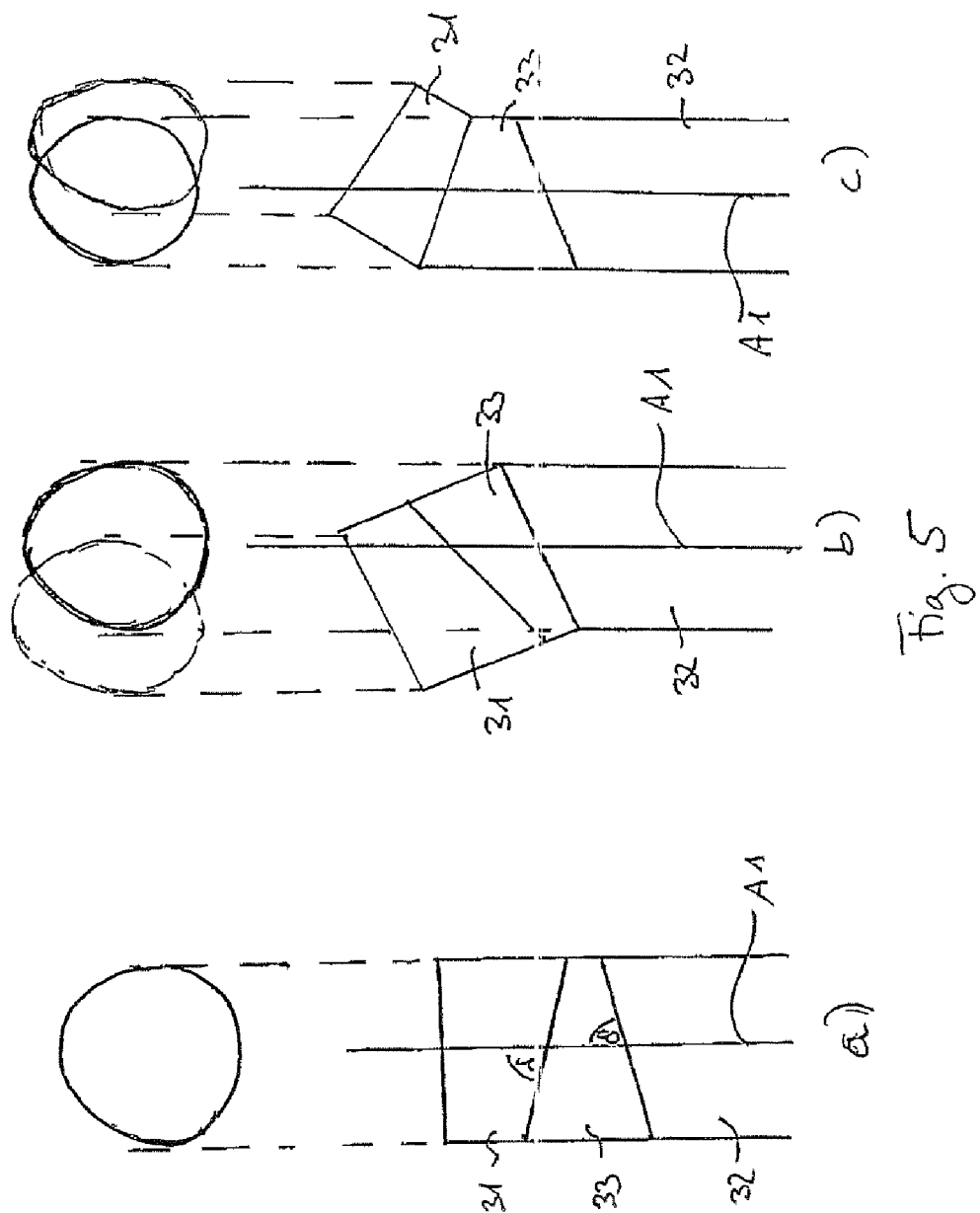
Figure 6:
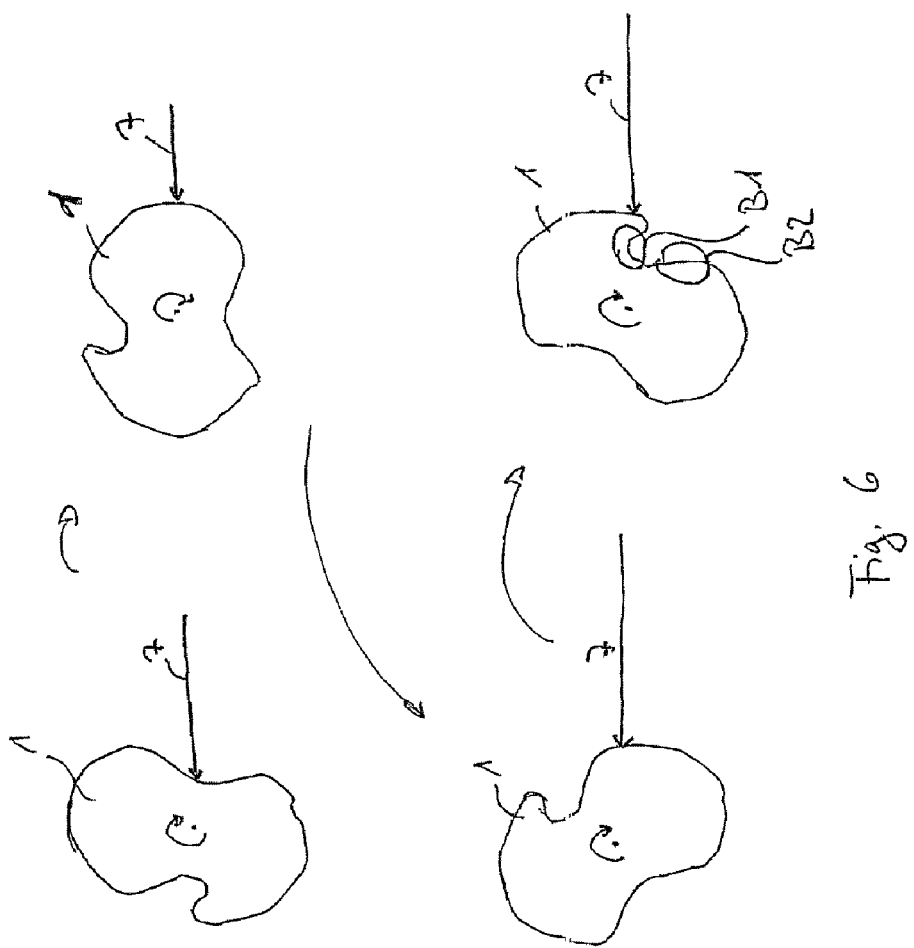
Figure 7:
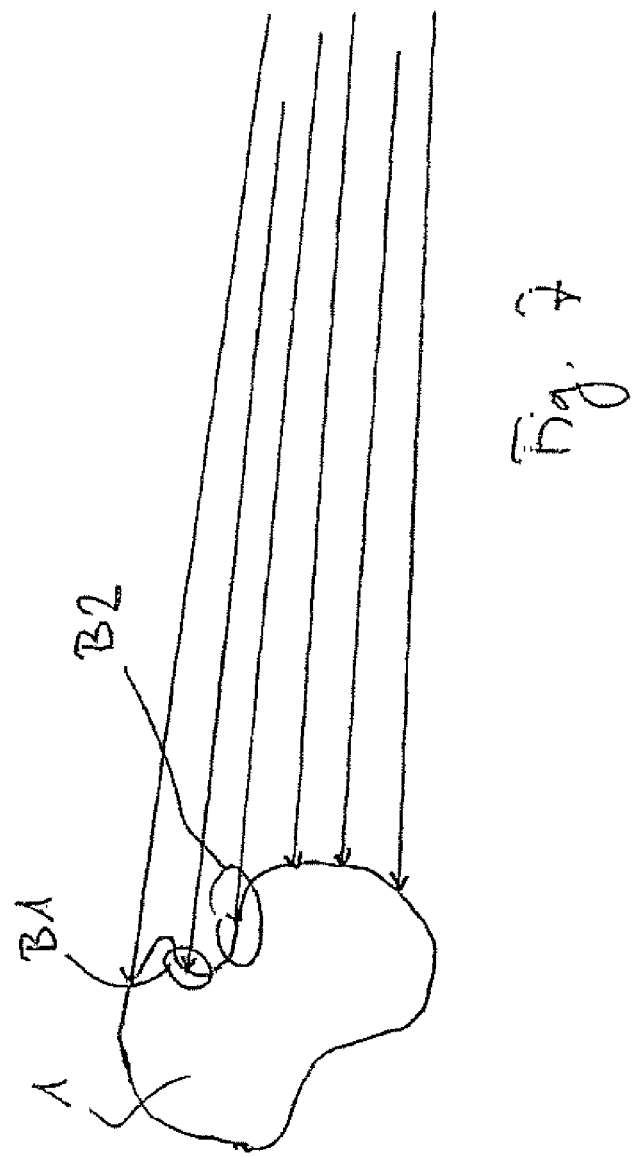
Figure 10:
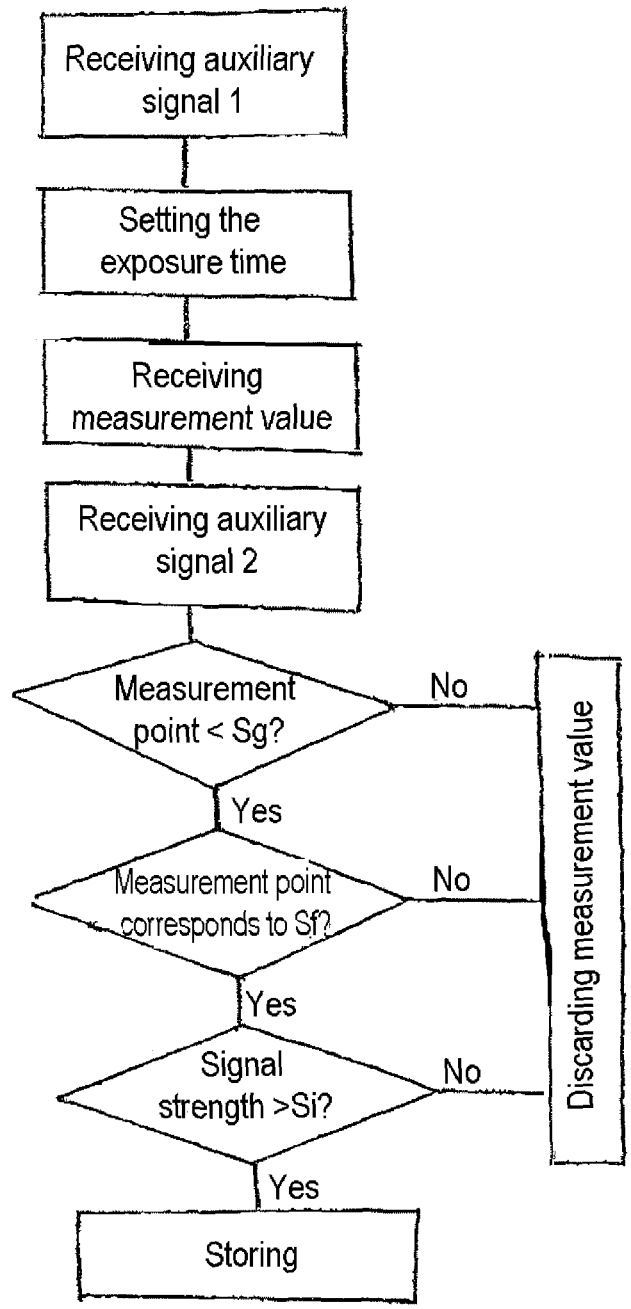

In the text which follows, the invention will be explained with reference to various exemplary embodiments and by means of figures, in which:

FIG. 1a shows a diagrammatic view of the entire scanning arrangement,

FIG. 1b shows a diagrammatic top view of the scanning arrangement according to FIG. 1a, FIG. 2 shows an alternative scanning arrangement in a diagrammatic view, FIG. 3a shows a perspective view of a mirror arrangement, FIG. 3b shows a diagrammatic top view of the mirror arrangement according to FIG. 3a, FIG. 3c shows a diagrammatic side view of an object and of the laser beams which impinge on the object at different angles via different mirrors of the arrangement according to FIG. 3a, FIGS. 4a to 4e show an embodiment of a holding device in various positions, FIGS. 5a to 5c show an alternative embodiment of a holding device in various positions, FIG. 6 shows a diagrammatic top view of an object and laser beams during the scanning of the rotating object, FIG. 7 shows a diagrammatic top view of an object and laser beams during the line-shaped scanning, FIGS. 8a to 8d show a diagrammatic side view of an object with non-parallel measuring lines, FIGS. 9a to 9d show various types of reference objects, and FIG. 10 shows a flow chart for processing measurement values.

FIGS. 1a and 1b show an embodiment of the scanning arrangement according to the invention. Object 1, light transmitter 2 and light receiver 3 are located at approximately the same level. The object 1 is mounted on a holding device 4 which can be rotated about the axis A1 by means of the drive M1 and can be moved in its height along the axis A1 by means of the drive M2, which is indicated with dashed lines. In addition, the holding device 4 can be tilted by the angle $\phi$ with respect to the axis of rotation A1 by means of the drive M3. The drives M1 to M3 are connected to a control and computing unit 6 by lines L1 to L3 and with the interface 6a, and can be controlled by this unit.

The light transmitter 2 and the light receiver 3 are connected to one another and form a transceiver unit 23. As a result, the angle $\beta$ between the emitted light beam 7 and the reflected light beam 8 is kept as small as possible. Small angles $\beta$ are advantageous because the intensity of the reflected beam 8 is greatest if the angle of incidence of the light on the object is close to 90°. With a small angel $\beta$, the greatest possible light intensity of the reflected light beam is thus measured. In addition, undercuts are covered better with a small angle $\beta$; to cover a data point, neither the incident beam 7 nor the reflected beam 8 must be cut off by an undercut.

The transceiver unit 23 can be pivoted about the axis A3 or the row 23a, respectively, (FIG. 1b), which is perpendicular to the plane of the image, and displaced along the rail 23a. The rail 23 is not necessarily straight as shown here but can also be bent, e.g. lie on a segment of circle around the object 4.

During the pivoting about the axis A3, it is possible that the transceiver unit 23 is continuously adjusted and locked in any positions by means of the drive M4. However, it is also conceivable that the transceiver unit 23 locks in a predetermined angular position. Along the rail 23a, the transceiver unit 23 can be advantageously continuously displaced by the drive M4, e.g. by means of a linear motor. Naturally, a stepping motor or a servomotor are also conceivable. The drive M4 is also connected to the control and computing unit 6 by the line L4 and the interface 6a and is controlled by this unit.

Both the light transmitter 2 and the light receiver are connected to the control and computing unit 6. In this example, the control and computing unit 6 is a commercially available computer on which a corresponding software product is installed. The computer can also be supplied or connected by the user himself.

From the control and computing unit 6, the position of the holding device 4 and of the transceiver unit 23 is directed and controlled by driving the drives M1 to M4. The data obtained from the receiver 3 are delivered by a connecting line 10 to the control and computing unit 6 where they are stored and evaluated. The control and computing unit 6 is connected to a screen 9 on which the digital representation of the object 1 is made visible. It is also possible that the control and computing unit 6 is connected to a milling machine or the like in order to manufacture a three-dimensional copy of the object.

For the measurement, the object 1 is rotated about the axis A1 in at least one measuring section and moved along the axis A1 in the direction of the arrow whilst the transceiver unit 23 is resting in a fixed position. Thus, a continuous line of measurement points produced on the surface of the object 1 by the light beam 7, 8 and the measurement values measured by the light receiver 3. If the object 1 is aligned along the axis A1, the measurement points are wound helically around the object 1. If the object 1 is tilted by the angle $\phi$ with respect to the axis A1 before the measuring section, the measurement points describe a continuous undulating line on the surface of the object 1.

If the object is scanned without rotating, the transceiver unit 23 is moved along the axis A3 for the measurement (FIG. 1b). The object is moved along the axis A1. One side of the object is then scanned with light beams 7 which are incident in parallel. Scanning takes place both on the forward path and on the return path of the transceiver unit 23 which leads to the object being scanned with a zigzag-shaped line. If, in contrast, measurements were only made when the unit 23 is moved in one direction, parallel lines would be produced on the surface of the object.

FIG. 2 diagrammatically shows another possible embodiment of the scanning arrangement according to the invention. In this embodiment, the laser light transmitter 2 is firmly mounted and emits the light approximately vertically downward. The light beam 7 is directed to the object 1 via a mirror arrangement 5. Via the mirror arrangement 5, a proportion of the reflected light also reaches the receiver 3 which is connected to the control and computing unit 6. The data obtained by the receiver 3 are stored in the unit 6 and processed further. In this case, the control and computing unit 6 is a computer permanently integrated in the arrangement, which can be connected to an external computer. The control and computing unit 6 is then driven via the external computer. The measurement data acquired are evaluated in the unit 6 and the user can access the evaluated data via the external computer.

Analogously to the receiver 3, a color-sensitive CCD camera 3' scans the surface of the object 1 which is illuminated by the light beam 7. The camera 3' generates an auxiliary signal which contains information on the surface characteristic and on the shape and size of the light spot on the object. In particular, these are values about the color, brightness, reflectivity and dullness of the surface of the object in the vicinity of the light spot, and the deviation from the circular shape and the size of the light spot itself.

The receiver 3 is arranged directly next to the transmitter 2 so that the reflected light 8 is directed into the receiver 3 and the camera 3' via the mirror arrangement 5. This is possible because the reflection is diffused in all directions. Since the receivers 3 and 3' are spaced equally far from the transmitter 2, approximately the same amount of light is received in both receivers 3 and 3'. The light beam 8' reflected into the receiver 3' is shown dotted. The positioning of the receiver 3' is not meant to be restrictive, the receiver 3' could also be placed differently. The essential factor is that the receiver 3' can detect the information necessary for the auxiliary signal.

Since the transmitter 2 and the receiver 3 are arranged directly next to one another, the angle $\beta$ between the emitted light beam 7 and the reflected light beam 8 is kept small. It is also advantageous that both beams 7 and 8 are directed via the mirror arrangement because the emitted beam 7 and the reflected beam 8 are thus subjected to the same conditions. As an alternative, the receiver 3 could also be arranged at the same level as the object 1, where attention would have to be paid to the fact that it is not located in the shadow of the mirror arrangement 5. The angle $\beta$ could thus also be kept small.

The object 1 is held by the holding device 4. The holding device 4 can be rotated about the axis A1. The object 1 can also be tilted by an angle $\phi$ with respect to the axis A1, which is indicated by dashed lines.

The mirror arrangement 5 can be rotated about axis A2 by means of the drive M5 and adjusted in its height along the axis A2 by means of the drive M6. The drives M5 and M6 are connected to the control and computing arrangement 6 by the lines L5 and L6. The mirror arrangement 5 is shown with dashed lines after it has been adjusted in its height and another mirror S has been selected by means of which the light beam 7 is directed to the object 1 from above.

The arrangement of the mirrors S1 to S4 is explained in greater detail in conjunction with FIG. 3. As shown in FIG. 3c, the light beam 7 is directed to the object at different heights. As an alternative, it would also be possible that, instead of the mirror arrangement 5, the holding device 4 is arranged to be adjustable in its height. Instead of such an arrangement of a number of mirrors, another arrangement could also be selected. For example, a single mirror could be used which is attached to a hinge and can be moved in various directions. A great advantage of the arrangement shown is its stability and the speed of scanning at different angles and from different mirror positions in order to illuminate undercuts.

According to FIGS. 3a and 3b, eight mirrors S1 to S4 are arranged conically around the axis of rotation A2. Two opposite mirrors have in each case the same inclination $\gamma$. The inclination angles $\gamma$ can be selected arbitrarily; in the case of a perpendicular light incidence, angles in the range of 120° to 150° have been found to be advantageous. Due to the different inclinations of the mirrors S, the light beam 7 is directed to the object 1 at different angles $\alpha$ depending on which mirror is in the beam path 7, 8, as shown in FIG. 3. In the individual part-figures, a different one of the mirrors S1 to S4 is in each case located in the beam path 7, 8. In the case of inclination angles $\gamma$ of more than 135°, the light beam 7 impinges on the object 1 from above and at less than 135° it impinges from below, and at 135°, the light beam impinges on the object 1 precisely horizontally. As a result, different areas of the object 1 can be scanned, or the same area can be scanned at different angles.

In the case of a very shallow incidence of light, the light spot becomes very oval on the object 1 and the intensity of the reflected beam 8 becomes small. Such points can be discarded because of their relatively great susceptibility to errors. This is explained in greater detail in conjunction with the flow chart in FIG. 10.

The object 1 is rotated about its own axis and scanned on points of the circumferential line by rotating the holding device 4. If the height of the mirror arrangement is changed at the same time, a helical line of measurement points is produced during the scanning around the object 1 as shown in FIG. 8a. The spacing of the helical turns depends on the speed of advance of the height adjustment by the drive M6 (FIG. 2). The closeness of the measurement points to one another is determined by the speed of rotation of the holding device 4. To be able to produce a reliable three-dimensional image from the measurement points, the measurement points should be no more than 0.4 mm apart. In the case of simple shapes of the object, this is possible at a speed of rotation of 2.5 revolutions per second and a height advance of 0.3 mm per revolution. This information is only used for explanation and is not meant to be restrictive.

FIG. 8b shows the object for a following measuring section tilted by the angle $\phi$ (FIGS. 1a and 2). Instead of the helical line according to FIG. 8a, a tumbling undulating line is produced on the surface of the object. The measuring lines of the two measuring sections are then definitely not parallel.

In a subsequent measuring section, the object 1 is scanned stationarily in various positions. During this process, selected sides of the object 1 are scanned during the measuring sections by rotating the mirror arrangement (FIGS. 2 and 3). As a result, the beam 7 is directed over the side of the object 1 facing the mirror arrangement 5 impinging on the object 1 at different angles $\alpha$ in the form of a line. The geometry of the mirror arrangement 5 allows the object 1 to be scanned at all predetermined angles of incidence $\alpha$ during a single pass over the height. As a result, much time can be saved compared with an arrangement in which the height must be scanned per angle. Since two opposite mirrors S are always mounted at the same angle of inclination $\gamma$ (FIG. 3b), it is also possible to move the mirror arrangement 5, whilst retaining the same speed of rotation, twice as quickly in its height than if different mirror inclinations are set, without the measuring accuracy decreasing during the process. This further shortens the duration of the scanning process.

Figure 4D:
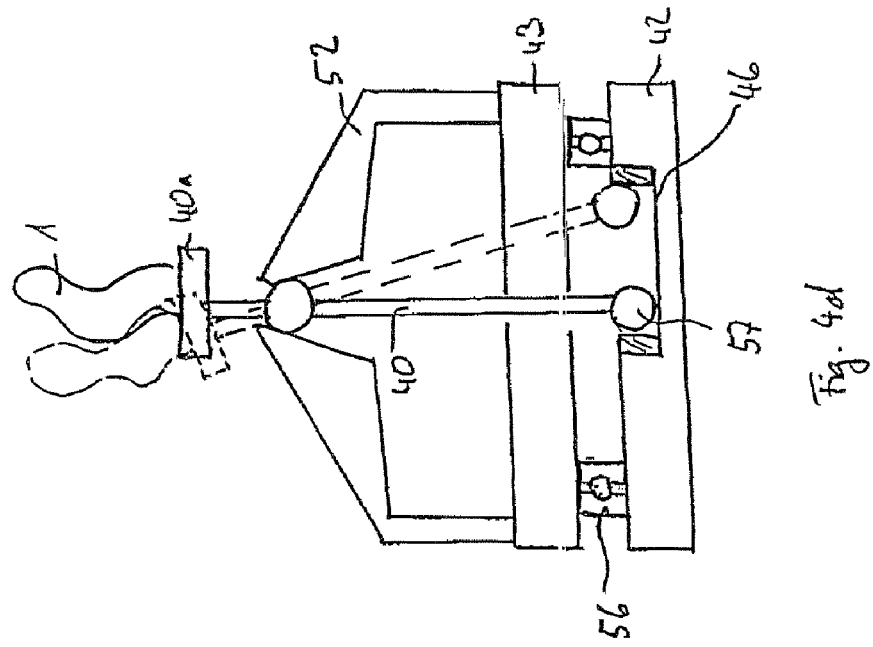
Figure 4C:
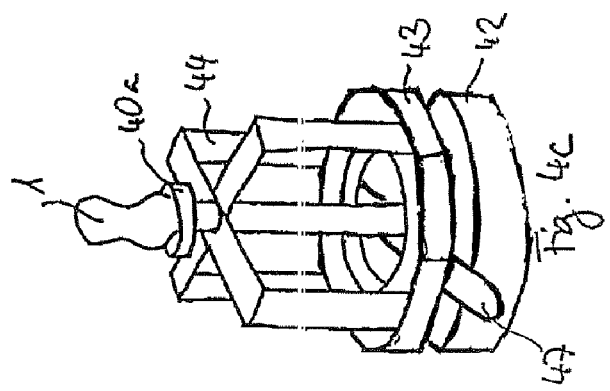

An embodiment of a holding device 4 is shown in FIGS. 4a to 4e. FIG. 4a shows a side view of the holding device 4. The upper part of the holding device 4 can be rotated about the axis A1 by means of the drive M1 with respect to a base plate 48. In a housing 49, a ball bearing, not shown, and a toothed-wheel connection, also not shown, are located via which the holding device 4 is joined to the drive M1. The object 1 is mounted on a holding bench 40a. This holding bench 40a is located on an axle 40 and is held in position by means of spring-steel strips 44. The spring-steel strips 44 are mounted on a support plate 43 (FIG. 4c).

The support plate 43 is joined to another support plate 42 via sliding bearing bodies 45. At the end of the axle 40, a ball race 41 is mounted which runs in a recess 46 of the support plate 42.

The axle 40 can assume two positions in the recess 46: either it is vertical, i.e. parallel to the axis of rotation A1 (shown with a continuous line), or it is tilted by the angle $\phi$ with respect to the axis of rotation A1. Since the wheel 41 runs in the recess 46, the object 1 slightly drops due to the tilting. The tilting movement is with a lever 47 (FIG. 4b, 4c). The lever 47 is located between the two support plates 42 and 43 and is mounted on the plate 42 pivotable around the point of rotation 47a.

A variant of the holding device 4 in which the object is not lowered will be explained below in conjunction with FIGS. 4d and 4e.

The lever 47 is operated by means of a stop 50 which is moved by means of the drive M3. The drive M3 is an electric lifting motor and the stop 50 is moved vertically, that is to say parallel to the axis A1. FIG. 4a shows two positions of the stop 50. The continuous line represents the rest position, the stop 50 is located below the support plate 42. The dashed line shows the position in which the lever 47 can be operated. The stop 50 is located at the level between the two plates 42 and 43, in the horizontal plane it is arranged next to support plates 42 and 43, in accordance with FIG. 4b.

FIG. 4b shows the plate 43 from below. The lever 47 is mounted on the plate 42, not shown.

The lever 47 protrudes past the two support plates 42 and 43. When the stop 50 is brought to the level of the lever (shown with dashed lines in FIG. 4a) and the holding device 4 is located by means of the drive M1, the lever 47 is held by the stop 50. When the support plate 43 continues to rotate in the course of rotation, the lever 47 brings the axle from the vertical position (continuous line) into the tilted position (dashed line). Thus, tilting of the object 1 is achieved by adjusting the height for the stop 50 by means of drive M3 and during rotation of the holding device 4 by means of drive M1.

So that the object 1 can be tilted into different directions relative to the axis of rotation A1, the support plate 43 with the spring-steel strips 44 and the axle 40 can be rotated with respect to the support plate 42. For this purpose, the support plate 43 is arranged on a sliding bearing body 45 and has a fitting annular groove 45a in which the bearing bodies 45 are running. The octagonal basic shape of the support plate 43 is meant purely as an example, other basic shapes can also be used for the same purpose.

When the axle 40 is in the vertical position, that is to say is parallel to the axis of rotation A1, the stop 50 can be brought to the level of the support plate 43 and the holding device can be rotated about the axis A1 by means of the drive M1. As soon as the stop edge 51 encounters the stop 50, the support plate 43 and the elements 40, 40a and 44 attached to it are rotated with respect to the support plate 42 and the recess 46.

Since continuous rotation is possible by means of the drive M1, the support plate 43 can be rotated by any angle with respect to the support plate 42.

When the drive M1 is stopped and the stop 50 is lowered, the new angular position of the plates 43 and 42 is fixed with respect to one another. The reason for this is that the sliding bearing bodies 45 in the groove 45a have such a large frictional resistance that the plate 43 does not rotate against the plate 42 without external influences. If the lever 47 is then operated again and the axle 40 is brought into the tilted position, the object 1 is tilted again by the same angle $\phi$ but the direction of tilt is different. Since the plates 42 and 43 can be rotated with respect to one another by any angle, the holding bench 40a with the object 1 can be tilted about the angle $\phi$ in any directions.

Instead of the axle 40 being erected when the object 1 is to be tilted into a different direction, the plates 42 and 43 can also be rotated with respect to one another by means of the mechanism described above whilst the axle 40 is in the tilted position. This is more advantageous with regard to the sequence of movement because the axle 40 only needs to be tilted once but the effect is the same: the axle 40 is tilted relative to the scanning arrangement, particularly relative to the incident light beam 7, in various directions.

The main advantage of such a holding device 4 is that the object can be tilted by the angle $\phi$ in any desired directions relative to the axis of rotation A1, and the production costs of the holding device are low. If it is to be avoided, with regard to the measuring method, that the object is lowered during the tilting, this can be achieved by means of the embodiment according to FIGS. 4d and 4e.

The axle 40 is fixed with a conically tapered head plate 52 instead of by means of the spring-steel strips 44. This head plate 52 is firmly mounted on the plate 43 and has a conical opening 54 for the axle 50. The axle 40 is fixed in this opening 54 by means of a sphere 53. The sphere 53 is pressed upward in the conical opening 54 by means of a spring 53a. If the axle 40 is then tilted, it describes a reciprocal movement which is limited by the stop cylinder 55. For this purpose, the wheel 41 has been replaced by the stop body 57.

Due to the reciprocal movement, the object 1 is always at approximately the same level. The cylindrical shape of the stops 55 is advantageous because the reciprocal movement of the axle 40 is limited very precisely as a result, particularly when the stop body 57 is spherical. However, the stops 55 and 57 can assume any suitable shape.

Figure 4E:
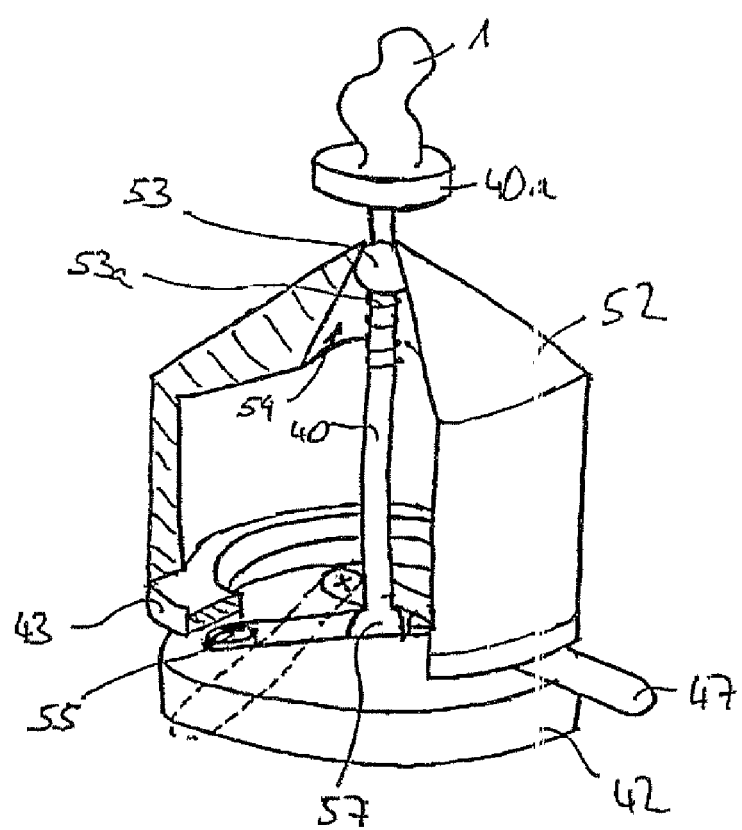

The head plate 52 according to FIGS. 4d and 4e is more stable than the spring-steel strips 44. This variant of the holding device is slightly more rugged than that described in FIGS. 4a to 4c. For the rest, however, the tilting mechanism is the same. One difference is that the sliding bearing 45, 45a has been replaced by a ball bearing 56. The rotation of the plates 42 and 43 with respect to one another can thus be produced by simple means. If the plates 42 and 43 are to be fixed in one position, however, a locking system is necessary.

As an alternative, the holding device 4 can also be fabricated as shown in FIG. 5. Essentially, it consists of two cylindrical sections 31 and 32 which are joined to one another via a wedge shaped cylinder section 33. The areas 31 and 32 are preferably at the angles $\delta$ and $\delta'$ of approx. 75 to 85° to the cylinder axis A1, wherein the two angles $\delta$ and $\delta'$ can be different. The cylinder sections 31 and 32 can be rotated by at least 180° against the wedge shaped cylinder section 33 via a ball bearing. The cylinder sections 31 and 32 can be locked in any positions by means of a magnetic brake. Some positions are shown in FIGS. 5a to 5c. Due to the geometry of this arrangement, the object 1 can be tilted at a different angle φ to the vertical axis A1.

Tilting the object by the angle φ has the effect that the grid of the measurement points on the object 1 is tilted. This is explained in greater detail in conjunction with FIG. 8. As shown in FIG. 8a, the grid lines G1 are wound helically around the object 1 and are produced when the object 1 is rotating during the measuring section. The grid lines G2 according to FIG. 8b are produced when the object 1 is tilted by the angle φ with respect to the position of the measuring section according to FIG. 8b and is scanned in a rotating manner. FIG. 8c shows the grid lines G3 which are produced when the object is at rest during the measuring section and the mirror arrangement rotates. The grid lines G4 are produced when the object 1 is tilted by the angle φ with respect to the measuring section according to FIG. 8c and is then scanned in the form of lines with a rotating mirror arrangement 5 without rotating itself.

As can be seen from FIG. 8, the tilting of the object 1 by the angle φ enables new measurement points to be reached and thus the accuracy to be enhanced. In addition, the probability of being able to scan an undercut is increased. As can be seen from FIG. 8, the holding device 4 is also scanned in all measuring sections. The bezel P at the top edge is used as reference object R for referencing the measuring section. The diameter d of the holding device 4 is known as is the size and the angle of the bezel P itself. All movements of the holding device 4 and of the mirror arrangement 5 are also known and can be repeated.

On the basis of this information, the position of the measurement points on the object 1 in relation to the reference object on the holding device 4 can be determined accurately, e.g. by trigonometric observations. Each measurement value which represents an abstract length information is entered on an actual point in the virtual digital grid by means of the information from the referencing. A separate digital grid is used for each measuring section. As a result, a new "cloud" of data points is produced in a three-dimensional grid with each measuring section.

If the holding device 4 is not running exactly concentrically during the rotation, this is also detected by measuring the bezel P as reference object R and taken into consideration during the construction of the image of the object 1. This further increases the measuring accuracy.

It is also of advantage if referencing is performed in each measuring section because, as a result, fluctuations of the arrangement due to external influences such as temperature or mechanical stressing do not corrupt the measurement result. Combining the images from different measuring sections also becomes simpler because referencing is performed in each measuring section because the images of the reference objects can then be placed above one another precisely and, as a result, the images of the object are also placed precisely above one another.

Placing the images above one another is achieved by entering the various images produced in measuring sections in a common grid. Some points are then overdetermined, that is to say have been achieved in a number of measuring sections but in the ideal case, the images of the different measuring sections complement one another.

As explained in conjunction with FIGS. 6 and 7, the more different measuring methods are used, the better the probability of detecting undercuts. In FIG. 6, the object 1 is shown from above and the light beams 7 impinge radially on the object 1 during its rotation. Various positions of the object are shown as steps in time of the rotation. The area B1 of the surface of the object 1 cannot be scanned in this way because the light beams 7 do not reach into the undercut. The area B2 is covered well because the light beams impinge almost vertically on the surface of the object in this area.

In FIG. 7, the same object is shown from above and this time it is not scanned rotating in lines. The light only impinges on the object in approximately parallel beams on one side. The area B1 is reached in this way because the angle of incidence α of the light beam on the object has been changed. The area B2, in contrast, is covered only very imprecisely because the light beams 7 impinge on the surface of the object 1 at a very small angle α.

FIG. 9 shows various forms of reference objects R. The reference objects R are unambiguous but can have many shapes and placements. Thus, objects which can be unambiguously calculated or areas unambiguously known can be used as reference objects; a reference object does not need to be a single body standing alone.

Reference objects R on the holding device are particularly preferred because in this case the movement of the reference objects R and of the holding device R correspond to one another (FIGS. 9a to 9c). This is of advantage particularly when the holding device 4 is moved strongly because any errors in the movement can be measured and taken into consideration.

In FIG. 9a, a bezel P on the holding device 4 forms the reference object R. This is particularly suitable because bezels are always ground in order to avoid sharp edges. The more pronounced form of this bezel P does not require any additional working step during the production. The examples from FIGS. 9b and 9c are more elaborate. In FIG. 9b, the reference objects R are defined by the spherical bulges K, in FIG. 9c, an annular indentation on the holding device forms the reference object.

If the reference objects R are not provided on the holding device 4 as in FIG. 9d, they must be arranged locally in such a manner that they do not cover the object 1. Nevertheless, they must be close enough to the object 1 to be within the range of vision of the light beam. Such reference objects R are thus less suitable. In addition, freestanding objects or bodies can be easily damaged so that they lose their accuracy. For this reason, reference objects as shown in FIGS. 9a to 9c are preferred.

In FIG. 10, a possible way of processing measurement values before the final storage is demonstrated with the aid of a flow chart. A first auxiliary signal is received which contains information about the brightness, color and reflectivity of the object in the area of the impinging light beam. On the basis of this information, the period of exposure for a measurement point and correspondingly the speed of the scanning light beam over the object is set. Following this, a measurement value and a second auxiliary signal are recorded at the same time. The auxiliary signal is used for checking whether the extent of the associated measurement point on the surface of the object 1 exceeds a threshold value Sp. If this is so, the measurement value is discarded because of lack of accuracy.

In the next step, the shape of the measurement point is compared with a predetermined shape Sf. If the shape of the measurement point is outside a tolerance range, e.g. is too elliptical, the measurement value is also discarded. This reduces the risk of inaccurate measurement values at shallow reflection angle being taken into consideration.

Finally, a check is made whether the signal strength of the measurement value exceeds a threshold value Si. If this is not so, the measurement value is discarded since the susceptibility to errors is higher with a weak signal. If the signal strength of the measurement value exceeds this threshold value Si, it is stored and inserted into the virtual grid when the measurement data are combined.

The order of the steps shown in this sequence is not mandatory. In particular, the order of the steps of the control steps can be varied. In addition, not all steps are necessary for reliable data evaluation and form a multiple backup in part. Depending on evaluation, a method for checking the characteristics of one measurement value may be sufficient, for example.

The invention claimed is:

1. A method for the contactless scanning of three-dimensional objects with a collimated light beam, said method comprising steps of
    scanning the object by at least two different measuring sections, and
    combining the measurement values of the measuring sections,
    wherein the lines of the measurement points of two different measuring sections are not parallel and/or the object rotates in one measuring section and not in the other in the case of two different measuring sections, and wherein a same area of the object is scanned in both measuring sections.

2. The method claimed in claim 1 wherein the light beam is directed to the object via a mirror arrangement.

3. The method claimed in claim 1 wherein the object is tilted in at least one measuring section with respect to the position of an earlier measuring section.

4. The method claimed in claim 1 wherein the object is scanned in at least one measuring section as it rotates about an axis of rotation, wherein the light source and/or a mirror arrangement are moved relative to one another for deflecting the light beam and the object so that the measurement points extend along a line on the surface of the object.

5. The method claimed in claim 1 wherein the light beam is moved in approximately parallel lines over the non-rotating object in at least one measuring section.

6. The method claimed in claim 1 wherein the light beam is moved over the non-rotating object in zigzag-shaped lines, the peaks of which can be located outside the object, in at least one measuring section.

7. The method claimed in claim 1 wherein the collimated light beam is directed onto the object at different angles with respect to the surface of the object.

8. The method claimed in claim 1 wherein at least one reference object outside the object is also scanned in addition to the object in predetermined measuring sections.

9. The method claimed in claim 8, wherein a predetermined part of a device for holding the object is also scanned as a reference object.

10. The method claimed in claim 1 wherein an auxiliary signal is generated which contains information on at least one of the surface characteristic of the object and the characteristics of the light beam impinging on the object.

11. The method claimed in claim 10, wherein the auxiliary signal is generated by a light receiver.

12. The method claimed in claim 11, wherein the light receiver is color sensitive.

13. The method claimed in claim 11, wherein the light receiver is a camera.

14. The method claimed in claim 13, wherein the camera is a CCD camera.

15. The method claimed in claim 10, wherein measurement values are discarded on the basis of at least one of their signal strength and the information contained in the auxiliary signal.

16. The method claimed in claim 10, wherein the light intensity of the light beam is varied based on the information contained in the auxiliary signal.

17. The method claimed in claim 1 wherein the object is scanned at least once when rotating and at least once when not rotating, the object is tilted in at least one measuring section compared with the position of an earlier measuring section, and the light beam is directed to the object via a rotatable mirror arrangement and in that a part of the holding device is also scanned for referencing in each measuring section.

18. A scanner for the contactless scanning of three-dimensional objects, said scanner comprising
    a transmitter for emitting collimated light beams,
    a receiver for detecting light signals,
    a holding device for receiving the object,
    means for connecting the holding device to a control and computing arrangement,
    a deflection arrangement for deflecting the light beam over the surface of the object whereby the object can be scanned by at least two different measuring sections, wherein the lines of the measurement points are not parallel in two different measuring sections and/or the control and computing arrangement is designed such that the object rotates during one measuring section and does not during the other one, and wherein the deflection arrangement and/or the control and computing arrangement are designed such that a same area of the object can be scanned in both measuring sections.

19. A scanner as claimed in claim 18, wherein the holding device for the object is rotatable about an axis of rotation.

20. The scanner as claimed in claim 18, further comprising, for one measuring section, an arrangement for tilting the object compared with the position of the object in another measuring section.

21. The scanner as claimed in claim 18, wherein the incident light beam and the holding device can be adjusted relative to one another in such a manner that the light beam can be directed over the entire object.

22. The scanner as claimed in claim 18, wherein the deflection arrangement is provided for directing the light beam in approximately parallel lines over the non-rotating object.

23. The scanner as claimed in claim 18, wherein the deflection arrangement is provided for directing the light beam in approximately zigzag-shaped lines over the non-rotating object, wherein the reversing points of the zigzag line can lie outside the object.

24. The scanner as claimed in claim 18, wherein the deflection arrangement is provided for directing the light beam over the object at different angles to the surface of the object.

25. The scanner as claimed in claim 18, wherein the deflection arrangement is a mirror arrangement.

26. The scanner as claimed in claim 25, wherein the mirror arrangement comprises a number of mirrors which are arranged to be rotatable about a common axis.

27. The scanner as claimed in claim 26, wherein mirrors of the mirror arrangement are mounted at different angles to the axis of rotation of the mirror arrangement.

28. The scanner as claimed in claim 26, wherein the mirrors of the mirror arrangement can be subdivided into at least two identical groups, wherein all mirrors within each group are mounted at different angles to the axis of rotation and the groups are arranged following one another around the axis of rotation.

29. The scanner as claimed in claim 18, further comprising an arrangement for generating an auxiliary signal which contains information about at least one of the surface characteristics of the object and about the characteristics of the scanning light beam on the object.

30. The scanner as claimed in claim 29, wherein a light receiver is provided for detecting the light intensity, the geometric shape and/or the extent of the light beam on the surface of the object and/or of the color and/or the value of reflectivity of the surface of the object in the area of the light beam on the object as a criterion for generating the auxiliary signal.

31. The scanner as claimed in claim 29, wherein the auxiliary signal and the measurement signal can be detected in the same receiver.

32. The scanner as claimed in claims 28, wherein the arrangement has at least one reference object for referencing the measurement points, which is unambiguous, where at least one reference object can be scanned in predetermined measuring sections.

33. The scanner as claimed in claim 32, wherein at least one reference object is located on the holding device or is formed by a part of the holding device.

34. The scanner as claimed in claim 32, wherein the reference object is formed by a conical area on the holding device.

35. The scanner as claimed in claim 32, wherein at least one reference object is formed by an at least partially spherical body.

* * * * *